US008959151B1

(12) United States Patent
Shlyapnikov

(10) Patent No.: US 8,959,151 B1
(45) Date of Patent: Feb. 17, 2015

(54) ESTABLISHING PER-PAGE MULTI-PARTY COMMUNICATION SESSIONS

(71) Applicant: Google Inc., Mountain View, CA (US)

(72) Inventor: Aleksey Shlyapnikov, San Jose, CA (US)

(73) Assignee: Google Inc., Mountain View, CA (US)

(*) Notice: Subject to any disclaimer, the term of this patent is extended or adjusted under 35 U.S.C. 154(b) by 184 days.

(21) Appl. No.: 13/644,853

(22) Filed: Oct. 4, 2012

(51) Int. Cl.
G06F 15/16 (2006.01)
H04L 12/24 (2006.01)
G06F 17/30 (2006.01)

(52) U.S. Cl.
CPC .......... H04L 41/00 (2013.01); G06F 17/30702 (2013.01)
USPC ............ 709/204; 709/203; 709/205; 709/206

(58) Field of Classification Search
CPC ......... H04L 12/24; H04L 12/56; H04L 29/06; H04L 29/08; H04L 63/08; H04L 65/1069; H04L 67/22; H04L 41/00; H04L 12/40071; H04L 12/1813; H04L 12/581; H04L 12/2496; H04L 65/2602; G06F 3/0483; G06F 17/30702
USPC .................. 709/203, 204, 206, 205; 707/734
See application file for complete search history.

(56) References Cited

U.S. PATENT DOCUMENTS

| 6,130,938 | A | 10/2000 | Erb |
| 6,192,119 | B1 | 2/2001 | Wilson |
| 6,411,989 | B1 * | 6/2002 | Anupam et al. ............. 709/204 |
| 6,697,478 | B1 | 2/2004 | Meldrum et al. |
| 6,754,322 | B1 | 6/2004 | Bushnell |
| 7,106,848 | B1 | 9/2006 | Barlow et al. |
| 7,336,779 | B2 * | 2/2008 | Boyer et al. ............. 379/265.02 |
| 7,366,990 | B2 * | 4/2008 | Pitroda ......................... 715/745 |
| 7,555,110 | B2 | 6/2009 | Dolan et al. |
| 7,610,287 | B1 * | 10/2009 | Dean et al. ............................ 1/1 |
| 7,742,468 | B2 | 6/2010 | Vagelos |
| 8,316,020 | B1 * | 11/2012 | Kleinmann ................... 707/734 |
| 8,819,560 | B2 * | 8/2014 | Ortwein et al. ............... 715/733 |
| 2002/0137490 | A1 * | 9/2002 | Gallant .......................... 455/411 |
| 2002/0143874 | A1 | 10/2002 | Marquette et al. |
| 2004/0107125 | A1 * | 6/2004 | Guheen et al. ..................... 705/7 |
| 2004/0258220 | A1 | 12/2004 | Levine et al. |

(Continued)

FOREIGN PATENT DOCUMENTS

WO WO02079984 10/2002

OTHER PUBLICATIONS

Adamic et al., "A Social Network Caught in the Web," Internet Journal, First Monday, Jun. 2, 2003, vol. 8, No. 6, pp. 1-22.

(Continued)

Primary Examiner — Thu Ha Nguyen
(74) Attorney, Agent, or Firm — Patent Law Works LLP

(57) ABSTRACT

A system and method for providing per-page multi-party communication sessions to users are disclosed. The system includes a communication module and a session module. The communication module receives page identification data identifying a web page navigated to by a user. The session module determines a multi-party communication session associated with the web page based at least in part on the page identification data and attribute data describing a communication attribute. The session module adds the user to the multi-party communication session associated with the web page.

20 Claims, 9 Drawing Sheets

(56) References Cited

U.S. PATENT DOCUMENTS

| | | | |
|---|---|---|---|
| 2005/0152521 | A1 | 7/2005 | Liljestrand |
| 2005/0181815 | A1* | 8/2005 | Shostak .................. 455/519 |
| 2005/0187781 | A1* | 8/2005 | Christensen ................ 705/1 |
| 2006/0026288 | A1 | 2/2006 | Acharya et al. |
| 2006/0047725 | A1* | 3/2006 | Bramson ................. 707/204 |
| 2006/0077957 | A1 | 4/2006 | Reddy et al. |
| 2006/0206604 | A1 | 9/2006 | O'Neil et al. |
| 2007/0127631 | A1 | 6/2007 | Difiglia |
| 2007/0171898 | A1 | 7/2007 | Salva |
| 2007/0173236 | A1 | 7/2007 | Vishwanathan et al. |
| 2007/0248077 | A1 | 10/2007 | Mahle, Jr. et al. |
| 2008/0056475 | A1 | 3/2008 | Brannick et al. |
| 2008/0192656 | A1 | 8/2008 | Vagelos |
| 2009/0147958 | A1* | 6/2009 | Calcaterra et al. ........... 380/260 |
| 2009/0172565 | A1* | 7/2009 | Jackson et al. .............. 715/753 |
| 2010/0031153 | A1* | 2/2010 | Ortwein et al. .............. 715/733 |
| 2010/0235909 | A1* | 9/2010 | Eynon et al. .................... 726/22 |
| 2010/0246800 | A1* | 9/2010 | Geppert et al. ......... 379/265.09 |
| 2010/0274815 | A1* | 10/2010 | Vanasco ...................... 707/798 |
| 2010/0306039 | A1* | 12/2010 | Green et al. ............... 705/14.4 |
| 2011/0098156 | A1 | 4/2011 | Ng et al. |
| 2011/0125842 | A1* | 5/2011 | Bernard et al. ............. 709/204 |
| 2011/0191417 | A1* | 8/2011 | Rathod ........................ 709/204 |
| 2011/0208822 | A1* | 8/2011 | Rathod ........................ 709/206 |
| 2011/0276396 | A1* | 11/2011 | Rathod ..................... 705/14.49 |
| 2012/0084349 | A1* | 4/2012 | Lee et al. ..................... 709/203 |
| 2012/0268553 | A1* | 10/2012 | Talukder .................. 348/14.08 |
| 2012/0317215 | A1* | 12/2012 | Brunner ...................... 709/206 |
| 2013/0073389 | A1* | 3/2013 | Heath ........................ 705/14.54 |
| 2013/0073615 | A1* | 3/2013 | Hall et al. .................... 709/203 |
| 2013/0132861 | A1* | 5/2013 | Kienzle et al. .............. 715/753 |
| 2013/0205000 | A1* | 8/2013 | Hall ............................ 709/223 |
| 2013/0263227 | A1* | 10/2013 | Gongaware et al. ............. 726/4 |
| 2013/0268350 | A1* | 10/2013 | Koonce et al. ............ 705/14.43 |
| 2014/0129942 | A1* | 5/2014 | Rathod ........................ 715/720 |
| 2014/0223464 | A1* | 8/2014 | Moran et al. .................... 725/12 |
| 2014/0237057 | A1* | 8/2014 | Khodorenko ................ 709/206 |
| 2014/0282586 | A1* | 9/2014 | Shear et al. .................. 718/104 |

OTHER PUBLICATIONS

Agarwal et al., "Enabling Real-Time User Interests for Next Generation Activity-Oriented Social Networks," Thesis submitted to the Indian Institute of Tehcnology Delhi, Department of Computer Sciences & Engineering, 2005, 70 pgs.
Anwar et al., "Leveraging 'Social-Network' Infrastructure to Improve Peer-to Peer Overlay Performance: Results from Orkut," University of Illinois at Urbana-Champaign USA, 2005, 9 pgs.
AT&T Personal Reach Service: Benefits and Features, Mar. 29, 2010, 7 pgs.
AT&T Personal Reach Service: Personal Reach Service, Mar. 29, 2010, 2 pgs.
Baird et al., "Neomillennial User Experience Design Strategies: Utilizing Social Networking Media to Support "Always On" Learning Styles," J. Educational Technology Systems, vol. 34(1), 2005-2006, Baywood Publishing Co., Inc., pp. 5-32.
Boyd, et al., "Social Network Sites: Definition, History, and Scholarship," Journal of Computer-Mediated Communication, International Communication Association, 2008, pp. 210-230.
Churchill et al., "Social Networks and Social Networking," IEEE Computer Society, Sep.-Oct. 2005, pp. 14-19.
Cohen et al., "Social Networks for Creative Collaboration," C&C '05, Apr. 12-15, 2005, London, United Kingdom, pp. 252-255.
Decker et al., "The Social Semantic Desktop," Digital Enterprise Research Institute, DERI Galway, Ireland, DERI Innsbruck, Austria, DERI Technical Report, May 2, 2004, 7 pgs.
Dukes-Schlossberg et al., "Battlefield Awareness and Data Dissemination Intelligent Information Dissemination Server," Air Force Research Laboratory, Rome Research Site, Rome, NY, Nov. 1, 1999, 31 pgs.
Eagle et al., "Social Serendipity: Proximity Sensing and Cueing," MIT Media Laboratory Technical Note 580, May 2004, 18 pgs.
Erickson et al., "Social Translucence: Using Minimalist Visualizations of Social Activity to Support Collective Interaction," Designing Information Spaces: The Social Navigation Approach, Springer-verlag: London, 2003, pp. 1-19.
Gross et al., "Information Revelation and Privacy in Online Social Networks," WPES '05, Alexandria, Virginia, Nov. 7, 2005, pp. 71-80.
Hammond et al., "Social Bookmarking Tools (I)," D-Lib Magazine, Apr. 2005, vol. II, No. 4, ISSN 1082-9873, 23 pgs.
Heer et al., "Vizster: Visualizing Online Social Networks," University of California, Berkeley, Oct. 23, 2005, 8 pgs.
International Search Report, International Application No. PCT/US2008/005118, Sep. 30, 2008, 2 pgs.
Leonard, "You Are Who You Know," Internet, retrieved at http://www.salon.com, Jun. 15, 2004, 15 pgs.
LiveJournal, "FAQ #163: How Do I Find a Syndicated Account?" Last Updated: thebubba, Jan. 6, 2004, 2 pgs.
Marwick, "Selling Your Self: Online Identity in the Age of a Commodified Internet," University of Washington, 2005, 192 pgs.
MediaSift Ltd., DataSift: Realtime Social Data Mining Platform, Curate and Data Mine the Real Time Web with DataSift, Dedipower, Managed Hosting, [Retrieved on May 13, 2011], 1 pg.
Metcalf et al., "Spatial Dynamics of Social Network Evolution," 23rd International Conference of the System Dynamics Society, Jul. 19, 2005, pp. 1-13.
Mori et al., "Real-world Oriented Information Sharing Using Social Networks," Group '05, Sanibel Island, Florida, USA, Nov. 6-9, 2005, pp. 81-84.
Nardi et al., "Blogging as Social Activity, or, Would You Let 900 Million People Read Your Diary?" CSCW'04, Nov. 6-10, 2004, vol. 6, Issue 3, Chicago, Illinois, pp. 222-231.
Neumann et al., "Semantic social network portal for collaborative online communities," Journal of European Industrial Training, 2005, Emerald Group Publishing, Limited, vol. 29, No. 6, pp. 472-487.
O'Murchu et al., "Online Social and Business Networking Communities," Digital Enterprise Research Institute DERI Technical Report, National University of Ireland, Aug. 11, 2004, 22 pgs.
Ring Central, Inc., Internet, retrieved at http://www.ringcentral.com, Apr. 19, 2007, 1 pg.
Singh et al., "CINEMA: Columbia InterNet Extensible Multimedia Architecture," Department of Computer Science, Columbia University, May 2002, pp. 1-83.
Steen et al., "Development of we-centric, context-aware, adaptive mobile services requires empathy and dialogue," Freeband FRUX, Oct. 17, 2005, Internet Journal, Netherlands, pp. 1-4.
Superfeedr Track, Internet, retrieved at http://blog.superfeedr.com/track/filter/xmpp/pubsubhubbub/track, May 13, 2011, 8 pgs.
Twitter Blog: Tracking Twitter, Internet, retrieved at http://blog.twitter.com/2007/09/tracking-twitter.html, May 13, 2011, 2 pgs.
Twitter Announces Fire Hose Marketplace: Up to 10K Keyword Filters for 30 Cents, Internet, retrieved at http://www.readywriteweb.com/archives/twitter_announces_fire_hose_marketplace_up_to_10k.php, May 13, 2011, 7 pgs.
Van Eijk et al., "We-centric, context-aware, adaptive mobile service bundles," Freeband, Telematica Instituut, TNO telecom, Nov. 30, 2004, 48 pgs.
Wenger et al., "Technology for Communities," CEFRIO Book Chapter v 5.2, Jan. 18, 2005, pp. 1-15.

\* cited by examiner

ESTABLISHING PER-PAGE MULTI-PARTY COMMUNICATION SESSIONS

BACKGROUND

The specification relates to multi-party communication sessions. In particular, the specification relates to providing a multi-party communication session associated with a web page to a user.

People may share information on a social network. Existing technologies allow a user to share information with other users by publishing one or more posts on a social network. For example, a user navigates to a web page. The user may share surfing experience related to the web page with other users by publishing a post on the user's social feed in a social network. However, this information sharing regarding the web page may be indirect since, for example, other users need to review updates in the user's social feed and navigate to the same web page via a link included in the updates of the user's social feed. The other users may then share their surfing experience related to the web page back with the user. This information sharing approach may not be implemented in real time and incurs a lag on the information exchange. It may be very desirable if the user can interact with other users in real time while visiting the web page or watching a video on the web page.

SUMMARY

In some embodiments, the specification describes a computer-implemented method including: receiving page identification data identifying a web page navigated to by a user; determining a multi-party communication session associated with the web page based at least in part on the page identification data and attribute data describing a communication attribute; and adding the user to the multi-party communication session associated with the web page.

In some embodiments, the features further include: transforming the page identification data to a session identifier that identifiers the multi-party communication session associated with the web page; and identifying the multi-party communication session using the session identifier. The features further include: transforming the page identification data to one or more session identifiers associated with the web page; identifying one or more multi-party communication sessions associated with the web page using the one or more session identifiers; and selecting the multi-party communication session from the one or more multi-party communication sessions based at least in part on the communication attribute. The features further include: the multi-party communication session being identified by a session identifier; the session identifier being an identifier identifying an address associated with the web page; the session identifier being a transformation of an address associated with the web page; and the communication attribute being associated with one of a location, an interest, a relationship in a social graph and demographic information.

In some embodiments, the operations further include: receiving configuration data from the user; and configuring the communication attribute based at least in part on the configuration data. The operations further include: receiving a signal indicating that the user exits navigating the web page; and disconnecting the user from the multi-party communication session associated with the web page responsive to receiving the signal.

The present disclosure may be particularly advantageous in a number of respects. First, the system can automatically provide a multi-party communication session associated with a web page to a user visiting the web page, which allows audiovisual interactions between the user and other users visiting the same web page. Second, the system can provide different multi-party communication sessions to a user if the user navigates to different web pages. For example, if a user navigates to a first web page, the system connects the user to a first multi-party communication session associated with the first web page. However, if the user navigates to a second web page, the system automatically disconnects the user from the first multi-party communication session and connects the user to a second multi-party communication associated with the second web page. Third, the system may determine a multi-party communication session associated with a web page for a user based at least in part on one or more customized communication attributes.

BRIEF DESCRIPTION OF THE DRAWINGS

The present disclosure is illustrated by way of example, and not by way of limitation in the figures of the accompanying drawings in which like reference numerals are used to refer to the same or similar elements.

DETAILED DESCRIPTION

Figure 1:
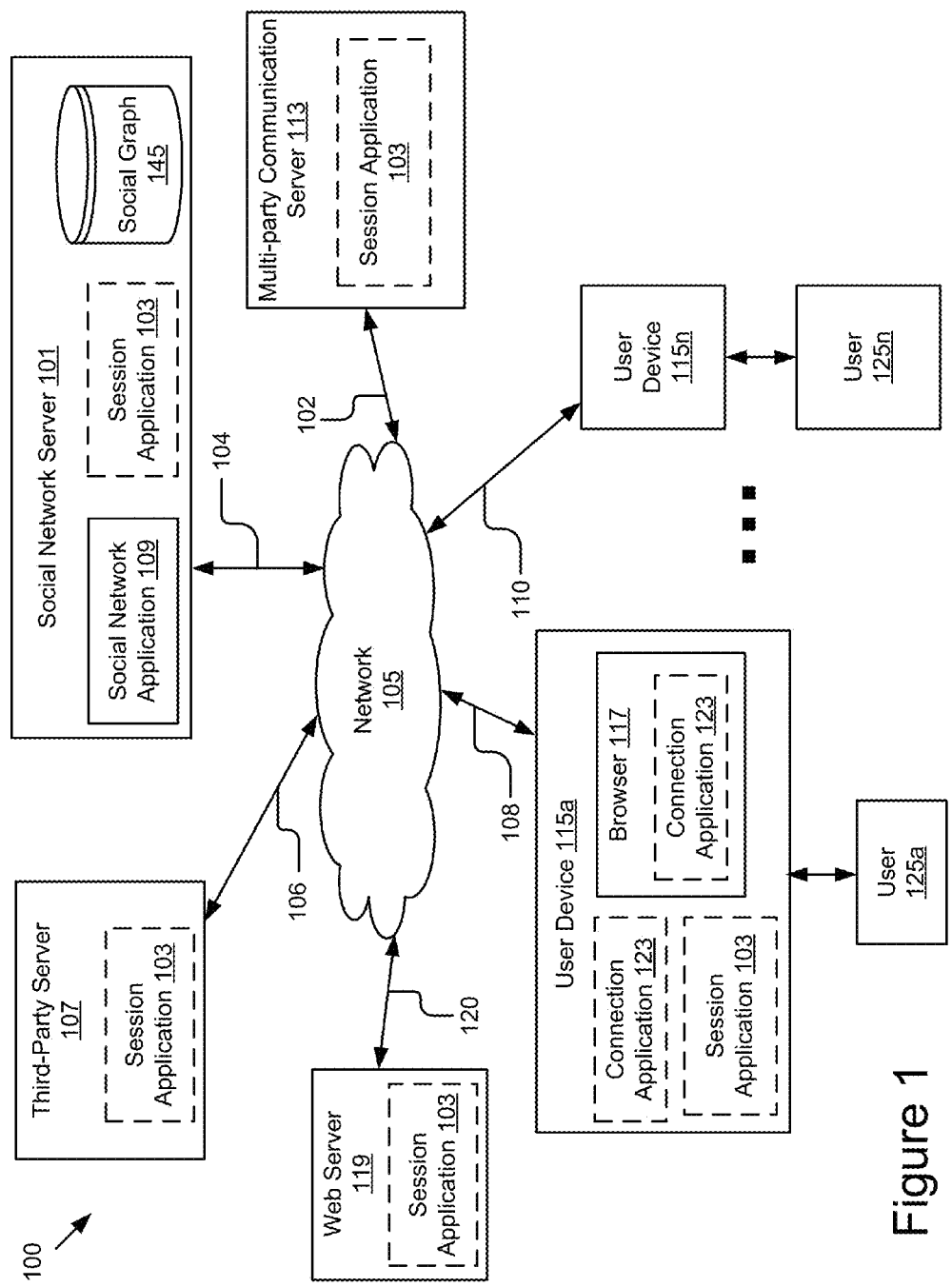
FIG. 1 is a block diagram illustrating an example of a system for providing per-page multi-party communication sessions to users.

In one embodiment, the system hosts a multi-party communication session for each web page. For example, the system transforms an identifier (ID) identifying the web page (e.g., an internet protocol (IP) address, a uniform resource locator (URL), etc.) to a session ID identifying a multi-party communication session associated with the web page. The system hosts the multi-party communication session identified by the session ID which allows users who navigate to the web page to interact with each other.

In another embodiment, the system hosts a plurality of multi-party communication sessions for each web page based at least in part on one or more communication attributes. For example, the system hosts a first multi-party communication session associated with a web page for a first location and a second multi-party communication session associated with the same web page for a second location. A communication attribute can be a category indication used to categorize multi-party communication sessions associated with a web page. For example, a communication attribute indicates to categorize multi-party communication sessions associated with a web page according to one of locations, interests, demographics or relationship in a social graph, etc.

In one embodiment, a first user navigates to a web page using a browser. The system determines page identification data that identifies the web page such as an IP address and/or a URL associated with the web page. The system determines a multi-party communication session associated with the web page based at least in part on the page identification data. For example, the system transforms the page identification data to a session ID and identifies a multi-party communication session for the web page using the session ID. The system adds the first user to the multi-party communication session identified by the session ID, which allows the first user to interact with other users that visit the same web page as the first user via the multi-party communication session.

In another embodiment, a first user and/or an administrator of the system configures one or more communication attributes for multi-party communication sessions associated with a web page. The first user navigates to a web page. The system determines a multi-party communication session for the first user from a plurality of multi-party communication sessions associated with the web page based at least in part on page identification data and the one or more customized communication attributes. For example, the system determines a plurality of session IDs associated with the web page based at least in part on the page identification data, and identifies a plurality of multi-party communication sessions corresponding to the plurality of session IDs. The system determines a multi-party communication session for the user from the plurality of multi-party communication sessions based at least in part on the one or more communication attributes. The system adds the first user to the determined multi-party communication session, which allows the first user to interact with other users that share the same communication attributes and visit the same web page as the first user.

FIG. 1 illustrates a block diagram of a system 100 for providing per-page multi-party communication sessions according to some examples. The illustrated system 100 includes a social network server 101, a third-party server 107, one or more user devices 115a-115n that can be accessed by one or more users 125a-125n, a web server 119 and a multi-party communication server 113. In the illustrated embodiment, these entities are communicatively coupled via a network 105. In FIG. 1 and the remaining figures, a letter after a reference number, for example "115a" represents a reference to the element having that particular reference number. A reference number in the text without a following letter, for example "115," represents a general reference to any or all embodiments of the element bearing that reference number.

The network 105 may be a conventional type network, wired or wireless, and may have any number of configurations for example a star configuration, token ring configuration or other configurations. Furthermore, the network 105 may include a local area network (LAN), a wide area network (WAN) (e.g., the Internet), and/or any other interconnected data path across which multiple devices may communicate. In yet another embodiment, the network 105 may be a peer-to-peer network. The network 105 may also be coupled to or includes portions of a telecommunications network for sending data in a variety of different communication protocols. In yet another embodiment, the network 105 includes Bluetooth communication networks or a cellular communications network for sending and receiving data for example via SMS/MMS, hypertext transfer protocol (HTTP), direct data connection, WAP, e-mail, etc. While only one network 105 is illustrated in FIG. 1, any number of networks 105 may be present.

The user devices 115a, 115n in FIG. 1 are used by way of example. Although only two user devices 115 are illustrated, any numbers of user devices 115 can be available to any number of users 125. The user device 115 can be any computing device that includes a memory and a processor. For example, the user device 115 can be a laptop computer, a desktop computer, a tablet computer, a mobile telephone, a personal digital assistant, a mobile email device, a portable game player, a portable music player, a television with one or more processors embedded therein or coupled thereto or any other electronic device capable of accessing the network 105, etc. In the illustrated embodiment, the user device 115a is communicatively coupled to the network 105 via signal line 108. The user device 115n is communicatively coupled to the network 105 via signal line 110.

In some embodiments, the user device 115 includes a browser 117 and a connection application 123. Optionally, the user device 115 may include a session application 103. The components of the user device 115 are communicatively coupled to each other. The session application 103 is depicted using dashed lines to indicate that in some embodiments the session application 103 may be included in one of the devices or in a combination of the devices. The connection application 123 is depicted using dashed lines to indicate that in some embodiments the connection application 123 may be part of the browser 117, an extension of the browser 117 or stored in a buffer associated with the browser 117. In one embodiment, at least part of the connection application 123 and/or the session application 103 may be implemented as an iFrame embedded on a web page.

The browser 117 can be code and routines stored in a memory and executed by a processor of the user device 115. The browser 117 includes any browser application that can retrieve data describing web pages hosted by a server (e.g., the social network server 101, the web server 119, the multi-party communication server 113, etc.). The browser 117 presents the web pages on a display device (not shown) connected to or included in the user device 115. The term web page used herein encompasses its plain and ordinary meaning including, but not limited to, any document or information resource that comprises textual elements, non-textual elements (e.g., static images, animated images, audio, video, etc.), interactive elements (for example, games, buttons, hyperlinks, etc.), scripts (e.g., JavaScript, code implementing Ajax techniques, etc.), metadata, etc. In some embodiments, a web page may be in any file format (e.g., HTML, HTML5, XHTML, XML, etc.).

The connection application 123 can be code and routines stored in a memory and executed by a processor of the user device 115 for connecting a user device 115 operating by a user to a multi-party communication session associated with a web page. In one embodiment, the connection application 123 receives configuration data from a user and configures one or more communication attributes for the user using the configuration data. The connection application 123 sends attribute data describing the one or more communication attributes to the session application 103.

In one embodiment, the connection application 123 determines that a user navigates to a web page using the browser 117. The connection application 123 determines page identification data identifying the web page and sends the page identification data to the session application 103. In one embodiment, the connection application 123 determines a user ID for identifying a user and/or a user device 115 such as an IP address, a user name or an email address, etc., and sends the user ID to the session application 103. The connection application 123 is described below in more detail with reference to FIGS. 2A, 3 and 5.

In some embodiments, the session application 103 may be operable on the social network server 101, which is coupled to the network 105 via signal line 104. The social network server 101 can be a hardware server that includes a processor, a memory and network communication capabilities. In some implementations, the social network server 101 sends and receives data to and from one or more of the user devices 115a, 115n, the multi-party communication server 113, the web server 119 and the third-party server 107 via the network 105. The social network server 101 includes a social network application 109 and a social graph 145. A social network can be a type of social structure where the users may be connected by a common feature. The common feature includes relationships/connections, e.g., friendship, family, work, an interest, etc. The common features may be provided by one or more social networking systems including explicitly defined relationships and relationships implied by social connections with other online users, where the relationships form a social graph. In some examples, the social graph can reflect a mapping of these users and how they can be related. Furthermore, the social network server 101 and the social network application 109 may be representative of one social network and that there may be multiple social networks coupled to the network 105, each having its own server, application and social graph. For example, a first social network may be more directed to business networking, a second may be more directed to or centered on academics, a third may be more directed to local business, a fourth may be directed to dating and others may be of general interest or a specific focus.

In some embodiments, the session application 103 may be stored on a third-party server 107, which is connected to the network 105 via signal line 106. In some implementations, the third-party server 107 can be a hardware server that includes a processor, a memory and network communication capabilities. The third-party server 107 sends and receives data to and from other entities of the system 100 via the network 105. While FIG. 1 includes one third-party server 107, the system 100 may include one or more third-party servers 107.

In some embodiments, the session application 103 may be stored on a multi-party communication server 113, which is connected to the network 105 via signal line 102. In some implementations, the multi-party communication server 113 can be a hardware server that includes a processor, a memory and network communication capabilities. The multi-party communication server 113 sends and receives data to and from other entities of the system 100 via the network 105. While FIG. 1 includes one multi-party communication server 113, the system 100 may include one or more multi-party communication servers 113.

In some embodiments, the session application 103 may be stored on a web server 119, which is connected to the network 105 via signal line 120. In some implementations, the web server 119 can be a hardware server that includes a processor, a memory and network communication capabilities. The web server 119 sends and receives data to and from other entities of the system 100 via the network 105. In one embodiment, the web server 119 hosts a website and provides one or more web pages to users upon request. While FIG. 1 includes one web server 119, the system 100 may include one or more web servers 119.

The session application 103 can be code and routines for hosting one or more multi-party communication sessions. For example, the session application 103 hosts one or more multi-party communication sessions for each web page based at least in part on one or more communication attributes. In one embodiment, a user navigates to a web page. The session application 103 determines a multi-party communication session associated with the web page for the user based at least in part on page identification data and one or more communication attributes. The session application 103 adds the user to the determined multi-party communication session, which allows the user to interact with other users that visit the same web page as the user via the multi-party communication session. For example, the multi-party communication session allows audiovisual interactions between the user and other users visiting the same web page. The session application 103 is described below in more detail with reference to FIGS. 2B, 3 and 6.

Figure 2A:
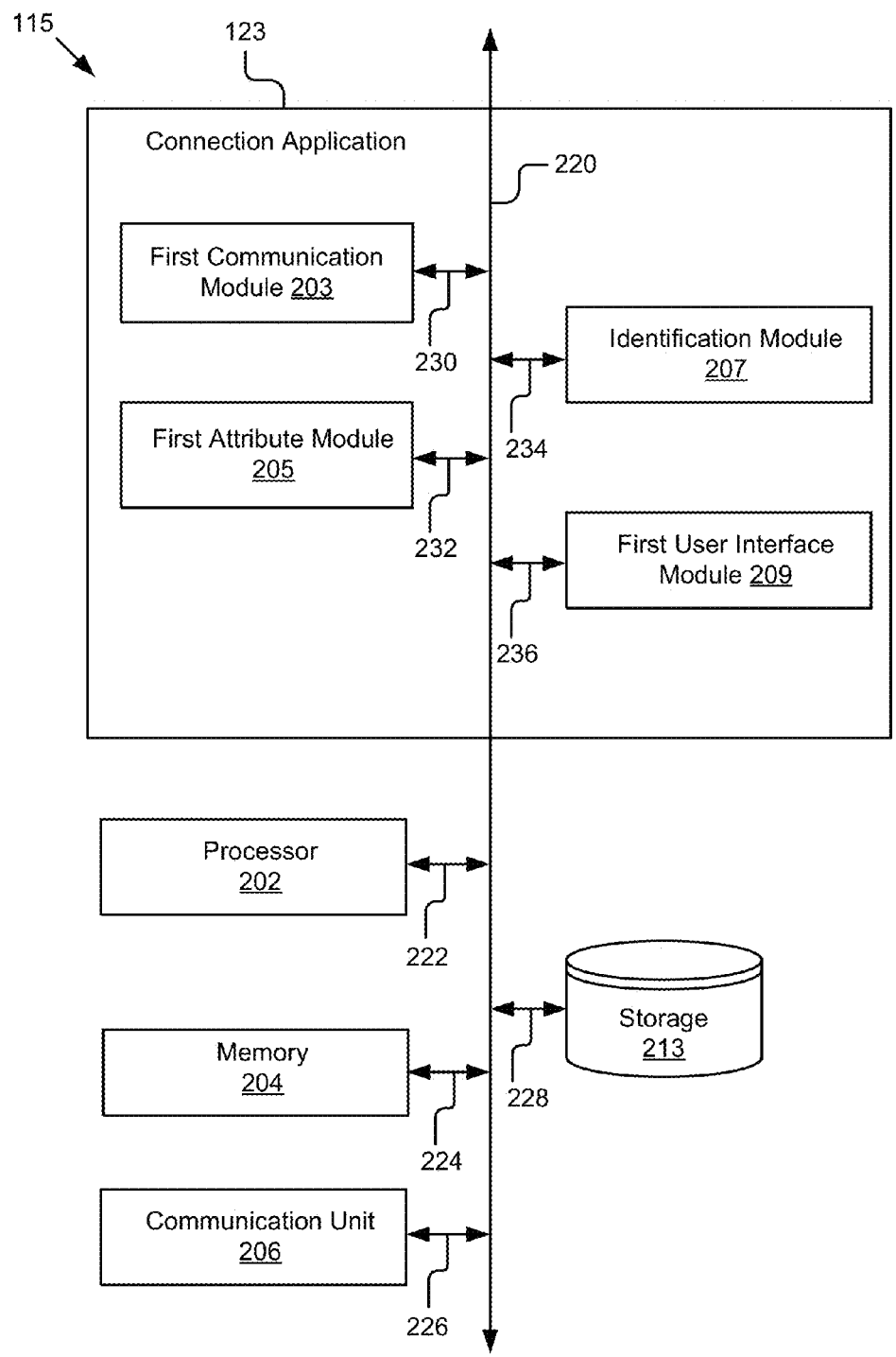
FIG. 2A is a block diagram illustrating an example of a connection application included in a user device.

Referring now to FIG. 2A, an example user device 115 is shown in more detail. FIG. 2A is an example block diagram of a user device 115 that includes a connection application 123, a processor 202, a memory 204, a communication unit 206 and a storage device 213. The components of the user device 115 are communicatively coupled to each other.

The processor 202 can include an arithmetic logic unit, a microprocessor, a general-purpose controller or some other processor array to perform computations and provide electronic display signals to a display device. In the illustrated embodiment, the processor 202 is coupled to the bus 220 via signal line 222 for communication with other components. Processor 202 may process data signals and may comprise various computing architectures including a complex instruction set computer (CISC) architecture, a reduced instruction set computer (RISC) architecture, or an architecture implementing a combination of instruction sets. Although only a single processor is shown in FIG. 2A, multiple processors may be included. The processing capability may be limited to supporting the display of images and the capture and transmission of images. The processing capability might be enough to perform more complex tasks, including various types of feature determination and sampling. Other processors, operating systems, sensors, displays and physical configurations may be possible.

The memory 204 can store instructions and/or data that may be executed by the processor 202. In the illustrated embodiment, the memory 204 is coupled to the bus 220 via signal line 224 for communication with the other components. The instructions and/or data may include code for performing any and/or all of the techniques described herein. The memory 204 may be a dynamic random access memory (DRAM) device, a static random access memory (SRAM) device, flash memory or some other memory device. In some embodiments, the memory 204 also includes a non-volatile memory or similar permanent storage device and media for example a hard disk drive, a floppy disk drive, a CD-ROM device, a DVD-ROM device, a DVD-RAM device, a DVD-RW device, a flash memory device, or some other mass storage device for storing information on a more permanent basis.

The communication unit 206 can transmit and receive data to and from other entities of the system 100. In the illustrated embodiment, the communication unit 206 is coupled to the network 105 and coupled to the bus 220 via signal line 226. In some embodiments, the communication unit 206 includes ports for direct physical connection to the network 105 or to another communication channel. For example, the communication unit 206 includes a USB, SD, or CAT-5 or similar port for wired communication with the social network server 101. In some embodiments, the communication unit 206 includes a wireless transceiver for exchanging data with the social network server 101, the third-party server 107, the multi-party communication server 113 and/or the web server 119 or any other communication channel using one or more wireless communication methods, for example IEEE 802.11, IEEE 802.16, BLUETOOTH or another suitable wireless communication method.

In one embodiment, the communication unit 206 includes a cellular communications transceiver for sending and receiving data over a cellular communications network for example via short messaging service (SMS), multimedia messaging service (MMS), hypertext transfer protocol (HTTP), direct data connection, WAP, e-mail or another suitable type of electronic communication. The communication unit 206 may also provide other conventional connections to the network 105 for distribution of files and/or media objects using standard network protocols (e.g., TCP/IP, HTTP, HTTPS and SMTP).

The storage device 213 can be a non-transitory memory that stores data for providing the functionality described herein. The storage device 213 may be a dynamic random access memory (DRAM) device, a static random access memory (SRAM) device, flash memory or some other memory devices. In some embodiments, the storage device 213 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis. In the illustrated implementation, the storage device 213 is communicatively coupled to the bus 220 via signal line 228.

In one embodiment, the storage device 213 stores attribute data describing one or more communication attributes configured by a user. In another embodiment, the storage device 213 stores data describing a browsing history of a user upon the consent of the user. For example, the storage device 213 stores page identification data identifying web pages visited by a user. In yet another embodiment, the storage device 213 stores user profile data associated with a user upon the consent of the user. Examples of user profile data include, but are not limited to, a user ID identifying a user, an interest, a geographic location for a user, demographic data associated with a user, education and/or working experience, etc. The storage device 213 can store other data for providing the functionality described herein.

In some embodiments, the connection application 123 includes a first communication module 203, a first attribute module 205, an identification module 207 and a first user interface module 209. In the illustrated embodiment, the components of the connection application 123 are communicatively coupled by the bus 220.

The first communication module 203 can be software including routines for handling communications between the components of the connection application 123 and other components of the system 100. In the illustrated embodiment, the first communication module 203 may be adapted for cooperation and communication with the processor 202 and other components of the user device 115 via signal line 230. In one embodiment, the first communication module 203 receives user inputs from the user device 115. The first communication module 203 sends the user inputs to other components of the connection application 123. For example, the first communication module 203 receives configuration data for configuring a communication attribute from a user and sends the configuration data to the first attribute module 205.

In one embodiment, the first communication module 203 receives data from other components of the connection application 123 and sends the data to the session application 103 via the communication unit 206. For example, the first communication module 203 receives attribute data describing a communication attribute from the first attribute module 205 and sends the attribute data to the session application 103. In another example, the first communication module 203 receives page identification data from the identification module 207 and transmits the page identification data to the session application 103.

In one embodiment, the first communication module 201 receives data from components of the connection application 123 and stores the data in the storage device 213. For example, the first communication module 201 receives attribute data describing a communication attribute from the first attribute module 205 and stores the attribute data in the storage device 213. In another embodiment, the first communication module 201 retrieves data from the storage device 213 and sends the data to components of the connection module 123. For example, the first communication module 201 retrieves user profile data from the storage 213 and sends the user profile data to the first attribute module 205.

The first attribute module 205 can be software including routines for configuring communication attributes. In the illustrated embodiment, the first attribute module 205 is coupled to the bus 220 via signal line 232. In one embodiment, the first attribute module 205 receives configuration data from a user via the first communication module 201 and configures one or more communication attributes for the user based at least in part on the configuration data. For example, the first attribute module 205 receives configuration data describing an interest of a user. The first attribute module 205 generates a communication attribute indicating that the user selects to participate in multi-party communication sessions associated with the interest.

In one embodiment, the first attribute module 205 retrieves user profile data from the storage 213 and determines a communication attribute for the user based at least in part on the user profile data. For example, the first attribute module 205 estimates an interest for the user from the user profile data, and determines a communication attribute for the user based at least in part on the interest.

In one embodiment, the first attribute module 205 stores attribute data describing the communication attribute in the storage 213. In another embodiment, the first attribute module 205 sends the attribute data to the session application 103 via the first communication module 201 and the communication unit 206.

The identification module 207 can be software including routines for determining page identification data for a web page. For example, the identification module 207 determines an IP address and/or a URL associated with a web page. In the illustrated embodiment, the identification module 207 is coupled to the bus 220 via signal line 234. In one embodiment, the identification module 207 determines that a user navigates to a web page using a browser 117. The identification module 207 determines page identification data for the web page. For example, the identification module 207 determines a URL for the web page. In one embodiment, the identification module 207 sends the page identification data to the session application 103 via the first communication module 203 and the communication unit 206.

In one embodiment, the identification module 207 optionally transforms the page identification data to one or more session IDs and sends the session IDs to the session application 103. For example, the identification module 207 performs a one-to-one mapping between the page identification data and a session ID such that the identification module 207 maps the page identification data to a session ID that identifies a multi-party communication session associated with the web page. In another example, the identification module 207 performs a one-to-many mapping between the page identification data and a plurality of session IDs such that the identification module 207 maps the page identification data to a plurality of session IDs that identify a plurality of multi-party communication sessions associated with the same web page.

In one embodiment, the page identification data uniquely identifying the web page may be used as a session ID for identifying a multi-party communication session associated with the web page. For example, a session ID may be a page ID (e.g., page identification data) identifying an address associated with the web page. In one embodiment, a session ID may be a transformation of an address associated with the web page. Other examples of a session ID include, but are not limited to, a unique number and/or a unique session name, etc.

The first user interface module 209 can be software including routines for generating graphical data for providing user interfaces to users. In the illustrated embodiment, the user interface module 209 may be adapted for cooperation and communication with the processor 202 and other components of the user device 115 via signal line 236. In one embodiment, the first user interface module 209 generates graphical data for providing a user interface to a user, allowing the user to input configuration data for configuring a communication attribute via the user interface. In some embodiments, the first user interface module 209 may generate other graphical data for providing other user interfaces to users.

Figure 2B:
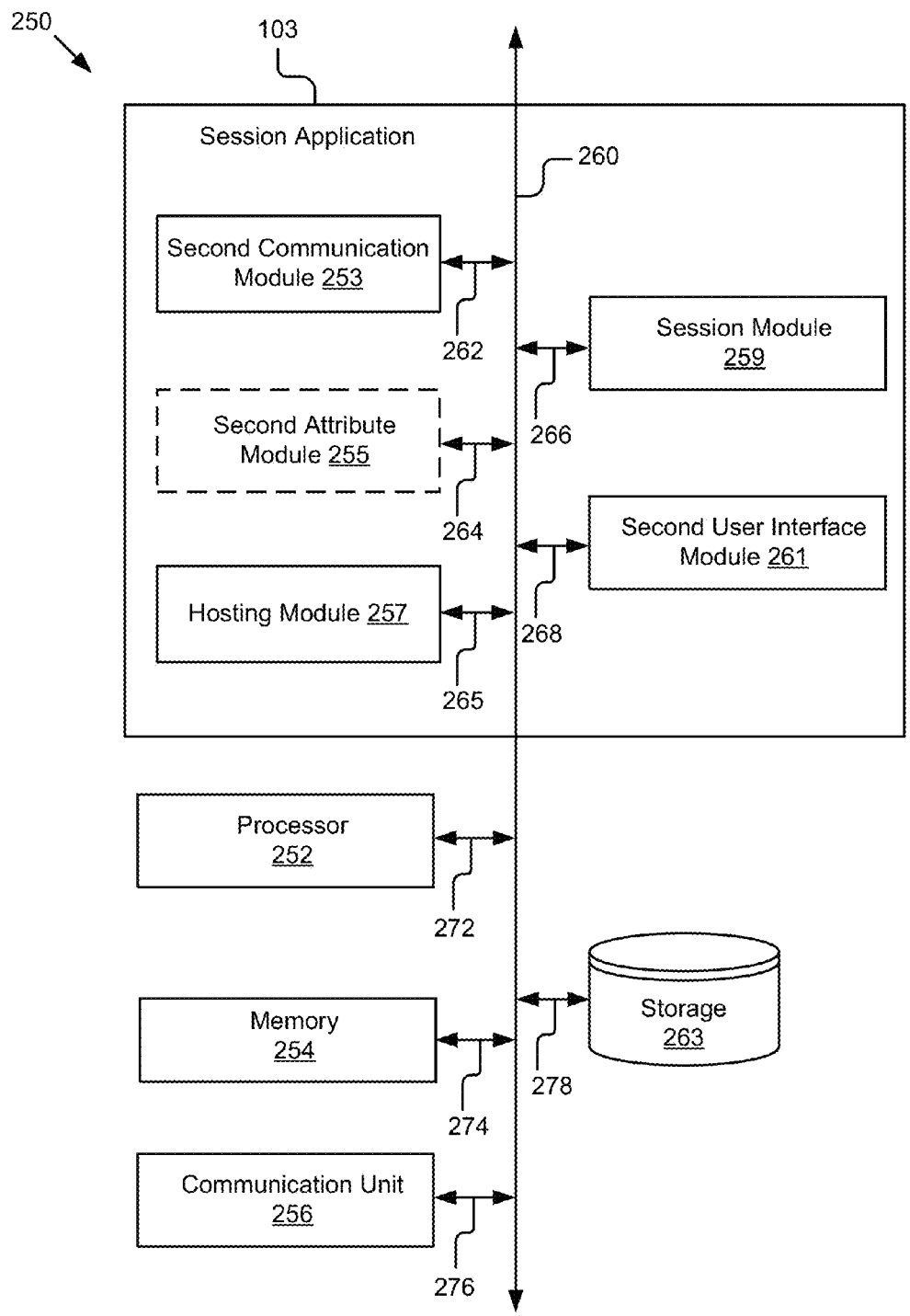
FIG. 2B is a block diagram illustrating an example of a session application.

Referring now to FIG. 2B, an example session application 103 is shown in more detail. FIG. 2B is an example block diagram of a computing device 250 that includes a session application 103, a processor 252, a memory 254, a communication unit 256 and a storage device 263. In the illustrated embodiment, these components of the computing device 250 are communicatively coupled by a bus 260. In one embodiment, the computing device 250 may be one of the social network server 101, the multi-party communication server 113, the third-party server 107, the user device 115 and the web server 119.

In the illustrated embodiment, the processor 252 is communicatively coupled to the bus 260 via signal line 272. The memory 254 is communicatively coupled to the bus 260 via signal line 274. The communication unit 256 is communicatively coupled to the bus 260 via signal line 276. The processor 252 has similar structures and provides similar functionality as the processor 202. The memory 254 has similar structures and provides similar functionality as the memory 204. The communication unit 256 has similar structures and provides similar functionality as the communication unit 206. The descriptions for these components will not be repeated here.

The storage 263 can be a non-transitory memory that stores data for providing the functionality of the session application 103. In the illustrated embodiment, the storage 263 is coupled to the bus 260 via signal line 278. In one embodiment, the storage 263 stores attribute data describing one or more communication attributes. In another embodiment, the storage 263 stores one or more session IDs for identifying one or more multi-party communication sessions. The storage 263 may store other data for providing the functionality described herein.

In some embodiments, the session application 103 includes a second communication module 253, an optional second attribute module 255, a hosting module 257, a session module 259 and a second user interface module 261. In the illustrated embodiment, the components of the session application 103 are communicatively coupled to the bus 260.

The second communication module 253 can be software including routines for handling communications between the components of the session application 103 and other components of the system 100. In the illustrated embodiment, the second communication module 253 may be adapted for cooperation and communication with the processor 252 and other components of the computing device 250 via signal line 262. In one embodiment, the second communication module 253 receives input data from an administrator of the computing device 250. The second communication module 253 sends the input data to the other components of the session application 103. For example, the second communication module 253 receives configuration data for configuring one or more communication attributes from an administrator and sends the configuration data to the second attribute module 255.

In one embodiment, the second communication module 253 receives data from a user device 115 via the communication unit 206 and sends the received data to other components of the session application 103. For example, the second communication module 253 receives attribute data describing a communication attribute from a user device 115 and sends the attribute data to the session module 259. In another example, the second communication module 253 receives page identification data from a user device 115 and sends the page identification data to the session module 259.

In one embodiment, the second communication module 253 receives data from components of the session application 103 and stores the data in the storage device 263. For example, the second communication module 253 receives attribute data from the second attribute module 255 and stores the attribute data in the storage device 263. In another embodiment, the second communication module 253 retrieves data from the storage device 263 and sends the data to other components of the session application 103. For example, the second communication module 253 retrieves attribute data from the storage 263, and sends the attribute data to the session module 259.

The optional second attribute module 255 provides similar functionality as the first attribute module 205, and the description will not be repeated here. In the illustrated embodiment, the second attribute module 255 may be adapted for cooperation and communication with the processor 252 and other components of the computing device 250 via signal line 264. In one embodiment, the second attribute module 255 receives configuration data from an administrator of the computing device 250 and configures a communication attribute for the computing device 250 using the configuration data. In one embodiment, the second attribute module 255 stores the attribute data in the storage 263. In another embodiment, the second attribute module 255 sends the attribute data to the session module 259.

The hosting module 257 can be software including routines for hosting one or more multi-party communication sessions. In the illustrated embodiment, the hosting module 257 may be adapted for cooperation and communication with the processor 252 and other components of the computing device 250 via signal line 265. In one embodiment, the hosting module 257 hosts a multi-party communication session for each web page. For example, the hosting module 257 transforms page identification data identifying a web page to a session ID for identifying a multi-party communication session associated with the web page, and hosts the multi-party communication session identified by the session ID for users visiting the web page.

In one embodiment, the hosting module 257 hosts a plurality of multi-party communication sessions for each web page based at least in part on one or more communication attributes. For example, if a communication attribute indicates that the multi-party communication sessions associated with a web page are categorized according to locations, the hosting module 257 hosts a first multi-party communication session for users from California that visits the web page and a second multi-party communication session for users from New York that visits the same web page. In this example, the first multi-party communication session and the second multi-party communication session can be associated with the same web page but different locations.

The session module 259 can be software including routines for determining a multi-party communication session for a user. In the illustrated embodiment, the session module 259 may be adapted for cooperation and communication with the processor 252 and other components of the computing device 250 via signal line 266. In one embodiment, the session module 259 receives page identification data identifying a web page and/or attribute data describing a communication attribute from the connection application 123. In another embodiment, the session module 259 retrieves attribute data from the storage 263. In yet another embodiment, the session module 259 receives attribute data from the second attribute module 255.

In one embodiment, the session module 259 determines a multi-party communication session associated with a web page based at least in part on page identification data identifying the web page. For example, the session module 259 uses the page identification data (e.g., a URL of the web page) as a session ID, and identifies a multi-party communication session for the web page using the session ID. In another example, the session module 259 determines the session ID as a transformation of the identifier of the web page (e.g., a one-to-one mapping from page identification data to a session ID), and identifies the multi-party communication session for the web page using the session ID.

In another embodiment, the session module 259 determines a multi-party communication session associated with a web page for a user based at least in part on page identification data of the web page and one or more communication attributes customized for the user and/or the web page. For example, the session module 259 transforms the page identification data to a plurality of session IDs associated with the web page (e.g., a one-to-many mapping from the page identification data to session IDs), and identifies a plurality of multi-party communication sessions corresponding to the plurality of session IDs. If a customized communication attribute indicates that multi-party communication sessions associated with the web page may be categorized by interests and the user may be interested in "reading," the session module 259 selects a multi-party communication session having participants interested in "reading" from the plurality of multi-party communication sessions. The session module 259 adds the user to the selected multi-party communication session upon the consent of the user, which allows the user to interact with other users who visit the same web page as the user and share the "reading" interest with the user.

In another example, if a customized communication attribute indicates that multi-party communication sessions associated with the web page may be categorized by locations and the user may be from California, the session module 259 selects a multi-party communication session designated for users from California from the plurality of multi-party communication sessions. The session module 259 adds the user to the selected multi-party communication session upon the consent of the user, which allows the user to interact with other users who may be from California and also visit the same web page as the user.

In yet another embodiment, the session module 259 receives a session ID transformed from page identification data from the connection module 123 and determines a multi-party communication session associated with the web page using the received session ID.

In one embodiment, the session module 259 notifies the user of the determined multi-party communication session. The session module 259 determines whether the user agrees to join the determined multi-party communication session. For example, the session module 259 instructs the second user interface module 261 to generate graphical data for providing a user interface to the user. The user interface depicts, for example, a message describing the determined multi-party communication session for the user and inquiring whether the user agrees to participate in the multi-party communication session. If the user agrees to join the multi-party communication session, the session module 259 adds the user that visits the web page to the multi-party communication session associated with the web page, which allows the user to interact with other users visiting the same web page via the multi-party communication session.

In one embodiment, a user navigates to a first web page and participates in a multi-party communication session associated with the first web page. The session module 259 receives a signal from a browser 117 indicating that the user closes the first web page and/or navigates to a second web page from the first web page. The session module 259 determines that the user exits the multi-party communication session associated with the first web page responsive to receiving the signal, and disconnects the user from the multi-party communication session associated with the first web page. The session module 259 determines a second multi-party communication session associated with the second web page for the user, and connects the user to the second multi-party communication session upon the consent of the user.

The second user interface module 261 can be software including routines for generating graphical data for providing user interfaces to users. In the illustrated embodiment, the second user interface module 261 may be adapted for cooperation and communication with the processor 252 and other components of the computing device 250 via signal line 268. In one embodiment, the second user interface module 261 generates graphical data for providing a user interface to an administrator of the computing device 250, allowing the administrator to input configuration data for customizing a communication attribute via the user interface.

In one embodiment, the second user interface module 261 generates graphical data for providing a user interface to a user. The user interface depicts, for example, a message describing the determined multi-party communication session for the user and inquiring whether the user agrees to participate in the multi-party communication session. The second user interface module 261 sends the graphical data to a user device 115, causing the user device 115 to present the user interface to the user. The second user interface module 261 may generate other graphical data for providing other user interfaces to users.

Figure 3:
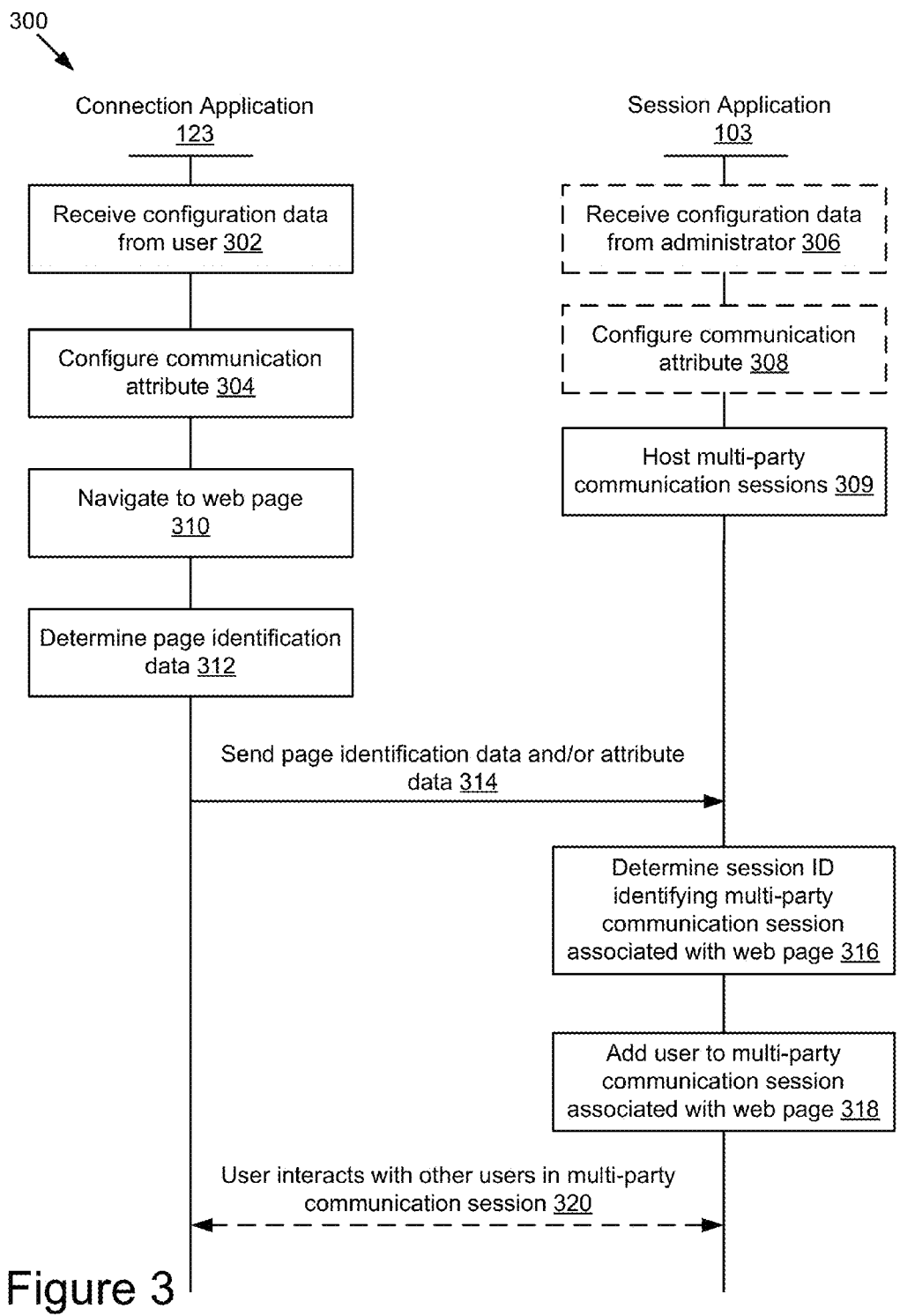
FIG. 3 is an event diagram illustrating a process for providing per-page multi-party communication sessions according to some examples.

FIG. 3 is an event diagram illustrating a process 300 for providing per-page multi-party communication sessions according to some examples. In one embodiment, the first communication module 203 included in the connection application 123 receives 302 configuration data from a user. The first communication module 203 sends the configuration data to the first attribute module 205. The first attribute module 205 configures 304 a communication attribute for the user based at least in part on the configuration data. In one embodiment, the first attribute module 205 stores attribute data describing the communication attribute in the storage 213.

In one embodiment, the second communication module 253 included in the session application 103 optionally receives 306 configuration data from an administrator. The second communication module 253 sends the configuration data to the second attribute module 255. The second attribute module 255 optionally configures 308 a communication attribute based at least in part on the configuration data received from the administrator. The hosting module 257 hosts 309 one or more multi-party communication sessions for one or more web pages.

In one embodiment, the identification module 207 determines that a user operating on a user device 115 navigates 310 to a web page using a web browser 117. The identification module 207 determines 312 page identification data for the web page. The first communication module 203 sends 314 the page identification data and/or the attribute data to the session application 103.

In one embodiment, the second communication module 253 receives the page identification data and/or the attribute data from the connection application 123. The second communication module 253 sends the page identification data and/or the attribute data to the session module 259. The session module 259 determines 316 a session ID for identifying a multi-party communication session associated with the web page based at least in part on the page identification data and/or the attribute data. The session module 259 adds 318 the user to the determined multi-party communication session upon the consent of the user, which allows the user to interact 320 with other user visiting the same page via the multi-party communication session.

Figure 4:
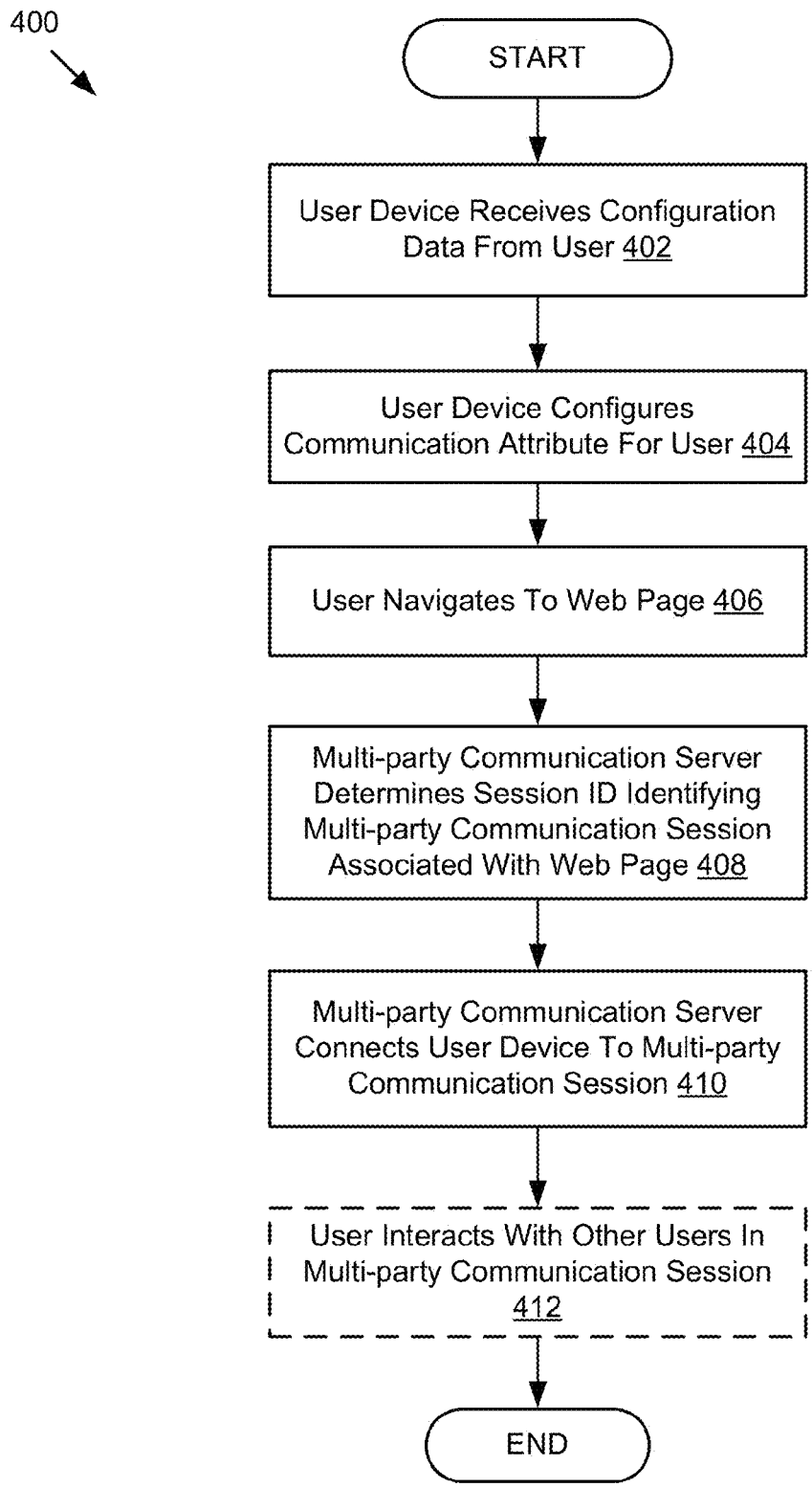
FIG. 4 is a flow diagram of an example method for providing per-page multi-party communication sessions to a user.

FIG. 4 is a flow diagram of an example method 400 for providing per-page multi-party communication sessions to a user. In one embodiment, a user device 115 receives 402 configuration data from a user. The user device 115 configures 404 one or more communication attributes for the user using the configuration data. The user device 115 determines that the user navigates 406 to a web page. The user device 115 sends page identification data identifying the web page to the multi-party communication server 113. The multi-party communication server 113 determines 408 a session ID identifying a multi-party communication session associated with the web page for the user. For example, the multi-party communication server 113 transforms the page identification data to a session ID. The multi-party communication server 113 connects 410 the user device 115 and/or the user to the multi-party communication session identified by the session ID upon the consent of the user. Optionally, the user interacts 412 with other users visiting the same page via the multi-party communication session.

Figure 5:
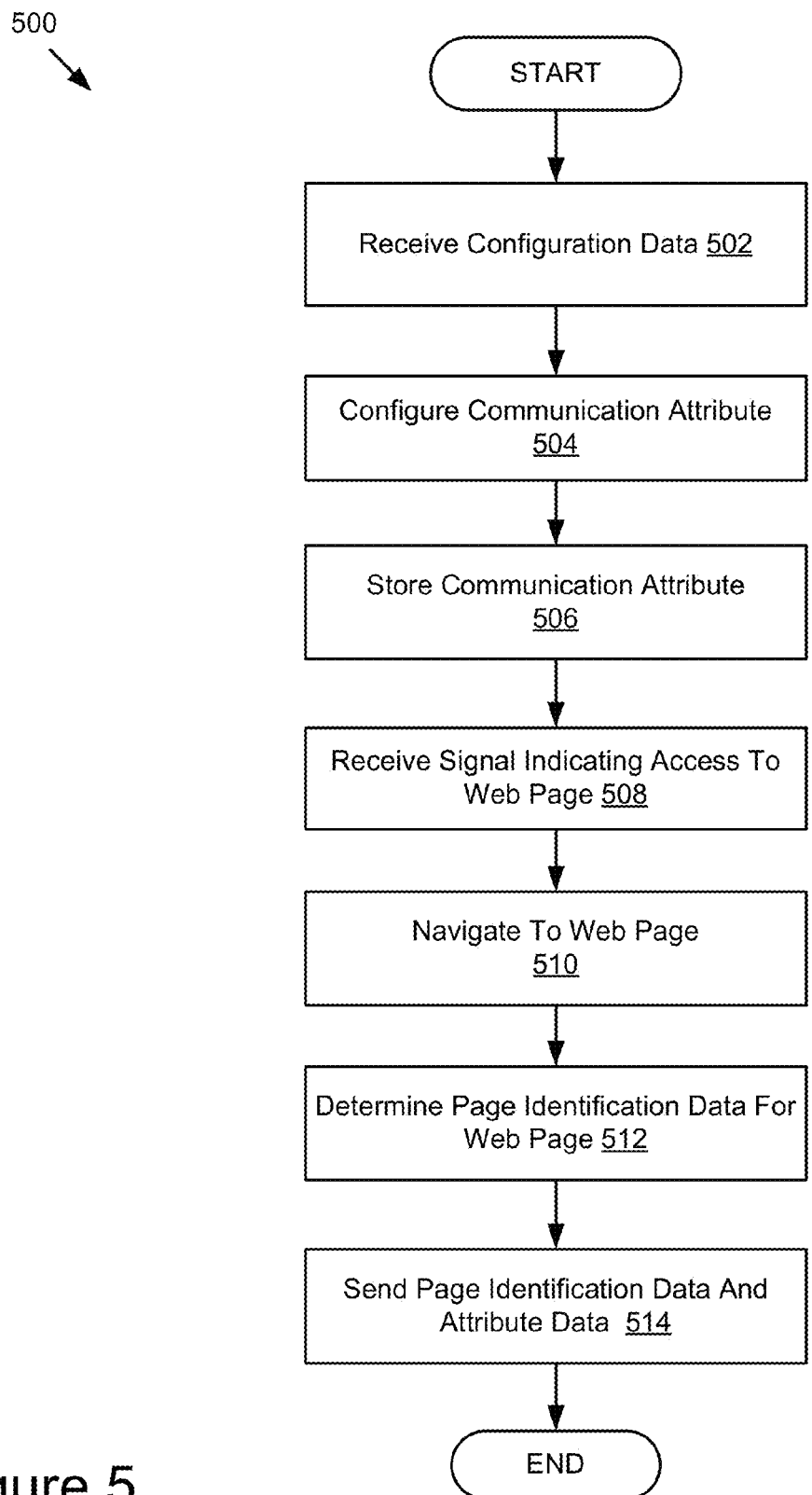
FIG. 5 is a flow diagram of an example method for providing per-page multi-party communication sessions to a user on a user device.

FIG. 5 is a flow diagram of an example method 500 for providing per-page multi-party communication sessions to a user on a user device. In one embodiment, the first communication module 203 receives 502 configuration data from a user and sends the configuration data to the first attribute module 205. The first attribute module 205 configures 504 one or more communication attributes for the user based at least in part on the configuration data. The first attribute module 205 stores 506 attribute data describing the one or more communication attributes in the storage 213.

In one embodiment, the identification module 207 receives 508 a signal indicating an access to a web page by the user from a browser 117. For example, the user navigates 510 to the web page using the browser 117, causing the browser 117 to send a signal to the identification module 207 indicating a navigation to the web page. The identification module 207 determines 512 page identification data for the web page. The first communication module 203 sends 514 the page identification data and/or the attribute data to the session application 103.

Figure 6:
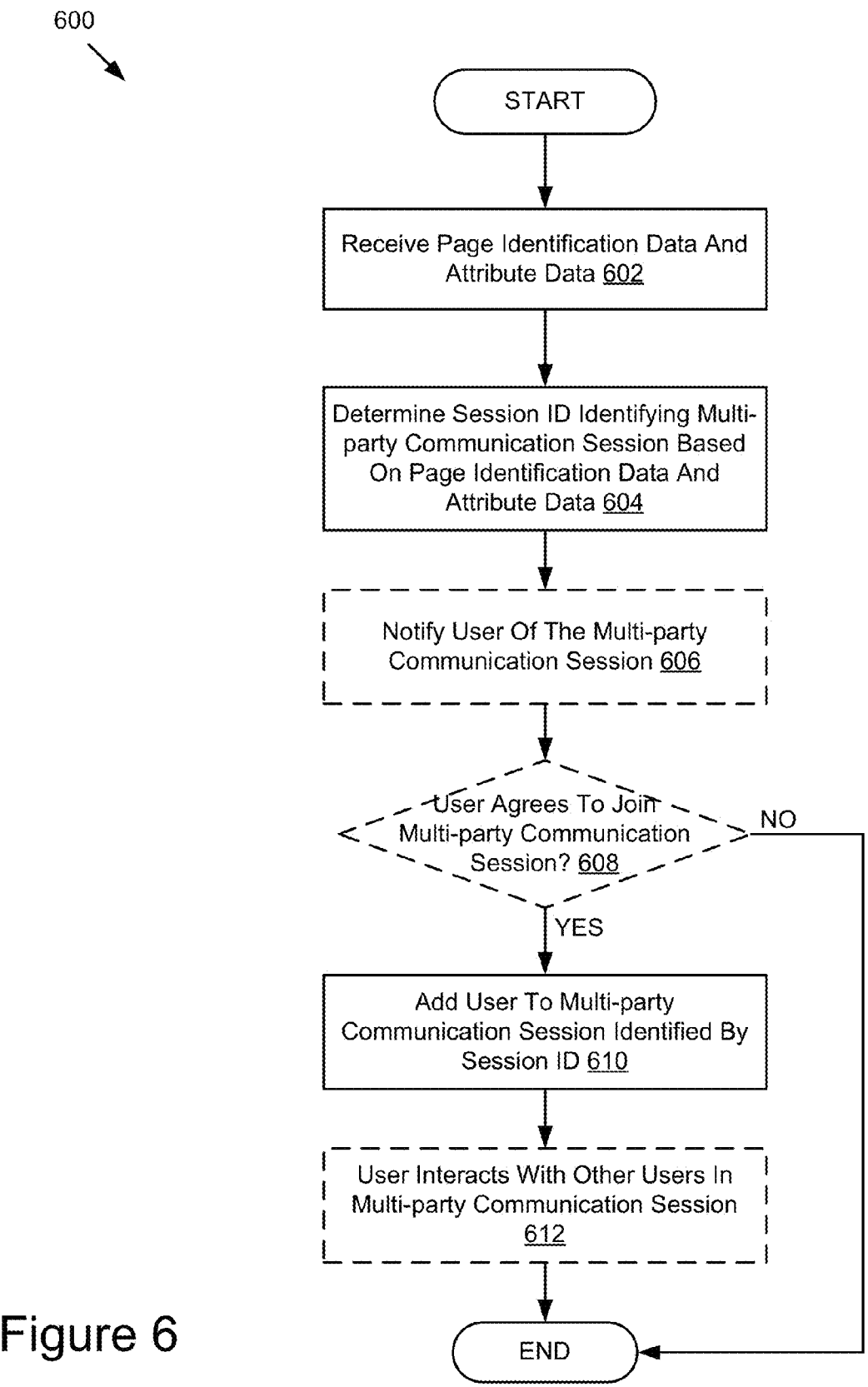
FIG. 6 is a flow diagram of another example method for providing per-page multi-party communication sessions to a user.

FIG. 6 is a flow diagram of another example method 600 for providing per-page multi-party communication sessions to a user. In one embodiment, the second communication module 253 receives 602 page identification data identifying a web page and/or attribute data describing one or more communication attributes from the connection application 123. The second communication module 253 sends the page identification data and/or the attribute data to the session module 259. The session module 259 determines 604 a session ID identifying a multi-party communication session associated with the web page based at least in part on the page identification data and/or the attribute data.

Optionally, the session module 259 instructs the second user interface module 261 to generate graphical data for notifying 606 the user of the multi-party communication session. The session module 259 determines 608 whether the user agrees to join the multi-party communication session. If the user refuses to join the multi-party communication session, the method 600 ends. If the user agrees to join the multi-party communication session, the session module 259 adds 610 the user to the multi-party communication session identified by the session ID. The user may optionally interact 612 with other users visiting the same web page via the multi-party communication session.

Figure 7A:
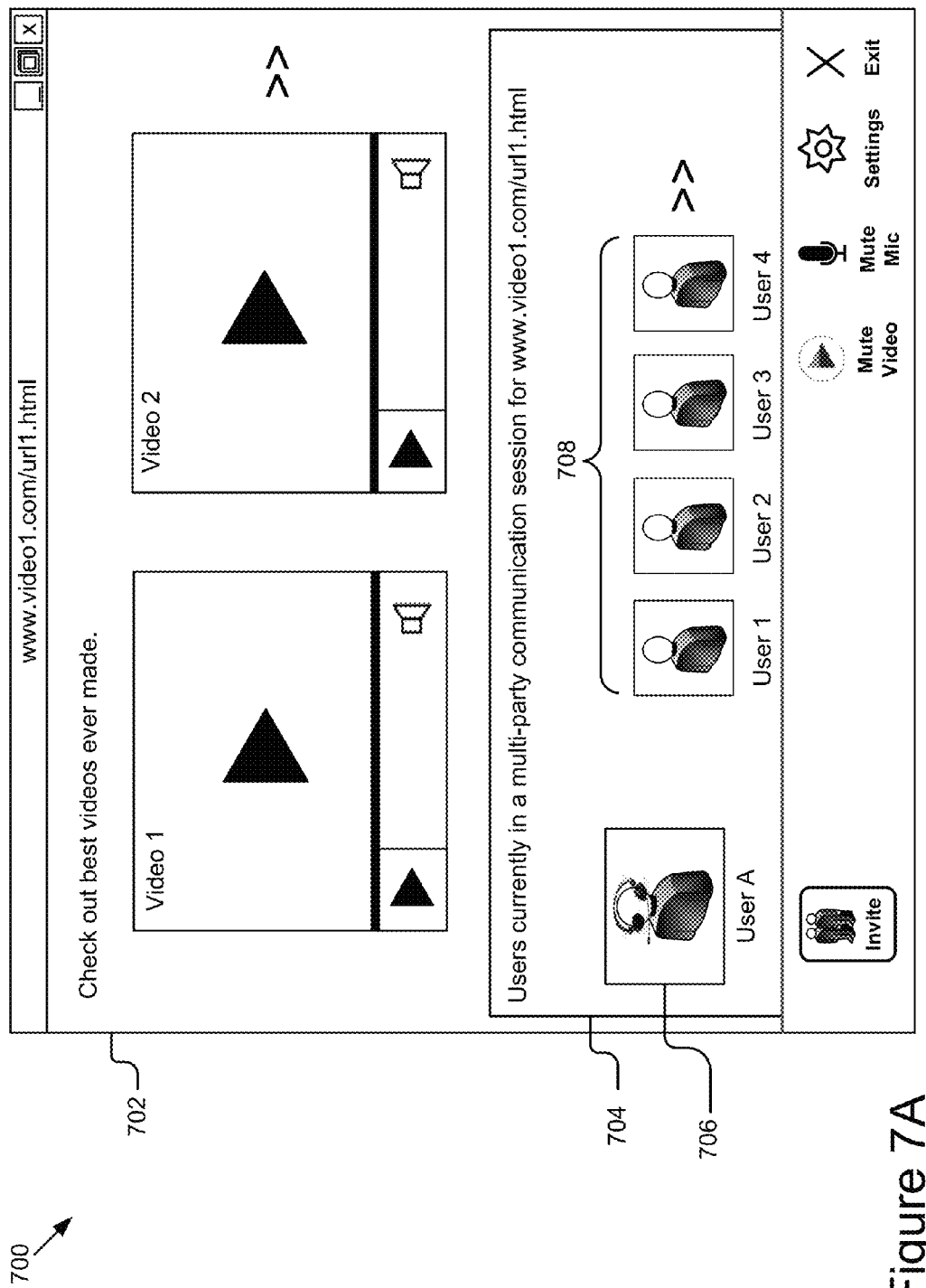
FIG. 7A is a graphic representation of an example user interface for providing per-page multi-party communication sessions to a user.

FIG. 7A is a graphic representation 700 of an example user interface 702 for providing a multi-party communication session associated with a web page to a user. In the illustrated embodiment, a user A 706 visits a web page (e.g., www.video1.com/url1.html). In one embodiment, the user interface 702 depicts the web page visited by the user A 706. The user interface 702 includes a section 704 depicting one or more users (e.g., the user A 706 and other users 708) currently participating in the multi-party communication session associated with the web page. The one or more users (e.g., the user A 706 and other users 708) may interact with each other via the multi-party communication session.

In one embodiment, the session module 259 automatically disconnects the user A 706 from the multi-party communication session for the web page when the user A 706 closes the web page or navigates to another web page. For example, if the user A 706 navigates from the current web page (e.g., www.video1.com/url1.html) to a new web page (e.g., www.shoes1.com/url1.html) as depicted in FIG. 7B, the session module 259 disconnects the user A 706 from the multi-party communication session for the current web page and connects the user A 706 to another multi-party communication session for the new web page.

Figure 7B:
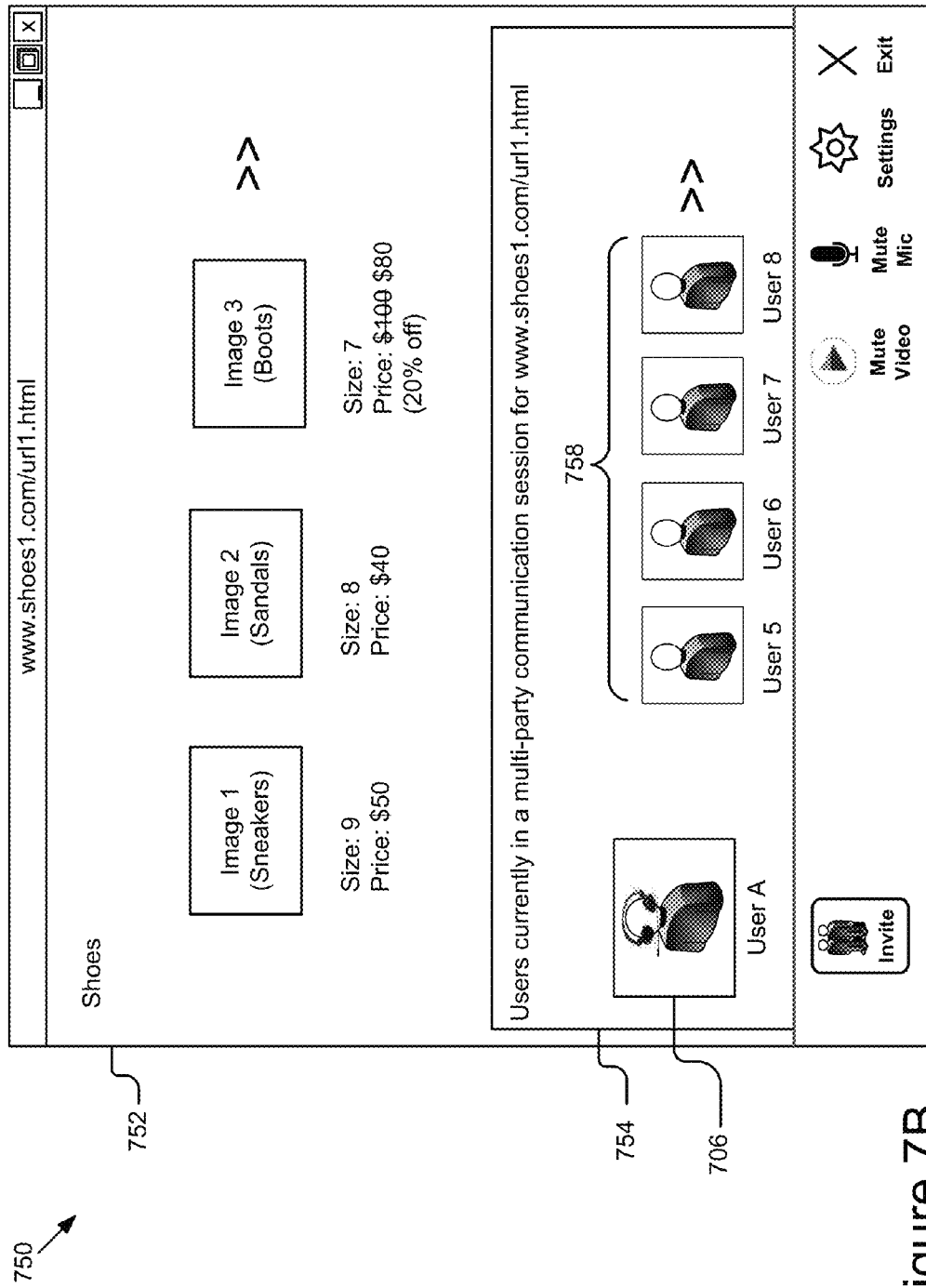
FIG. 7B is a graphic representation of another example user interface for providing per-page multi-party communication sessions to a user.

FIG. 7B is a graphic representation 750 of another example user interface 752 for providing a multi-party communication session to a user. In the illustrated embodiment, the user A 706 navigates to a new web page (e.g., www.shoes1.com/url1.html). The user interface 752 depicts the current web page visited by the user A 706. The user interface 752 includes a section 754 depicting one or more users (e.g., the user A 706 and other users 758) currently participating in the multi-party communication session associated with the web page. The one or more users (e.g., the user A 706 and other users 758) may interact with each other via the multi-party communication session.

In the above description, for purposes of explanation, numerous specific details are set forth in order to provide a thorough understanding of the specification. It will be apparent, however, to one skilled in the art that the invention can be practiced without these specific details. In other instances, structures and devices are shown in block diagram form in order to avoid obscuring the description. For example, the present embodiment is described in one embodiment below primarily with reference to user interfaces and particular hardware. However, the present embodiment applies to any type of computing device that can receive data and commands, and any peripheral devices providing services.

Reference in the specification to "one embodiment" or "an embodiment" means that a particular feature, structure, or characteristic described in connection with the embodiment is included in at least one embodiment of the description. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present embodiment of the specification also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The specification can take the form of an entirely hardware embodiment, an entirely software embodiment or an embodiment containing both hardware and software elements. In a preferred embodiment, the specification is implemented in software, which includes but is not limited to firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats. Furthermore, as will be apparent to one of ordinary skill in the relevant art, the modules, routines, features, attributes, methodologies and other aspects of the disclosure can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the disclosure is in no way limited to implementation in any specific programming language, or for any specific operating system or environment. Accordingly, the disclosure is intended to be illustrative, but not limiting, of the scope of the specification, which is set forth in the following claims.

What is claimed is:

1. A computer-implemented method comprising:
receiving configuration data from a user;
configuring one or more communication attributes for the user based at least in part on the configuration data;
storing attribute data describing the one or more communication attributes in a storage device;
receiving page identification data identifying a first web page navigated to by the user;
transforming the page identification data to one or more session identifiers associated with the first web page;
identifying one or more multi-party communication sessions associated with the first web page using the one or more session identifiers;
determining a first multi-party communication session for the user from the one or more multi-party communication sessions based at least in part on the attribute data;
adding the user to the determined multi-party communication session associated with the first web page;
determining that the user exits the first web page and navigates to a second web page;
responsive to the user exiting the first web page, disconnecting the user from the first communication session associated with the first web page;
responsive to the user navigating to the second web page, determining a second multi-party communication session associated with the second web page based at least in part on the attribute data and page identification data identifying the second web page; and
adding the user to the second multi-party communication session associated with the second web page.

2. A computer-implemented method comprising:
receiving page identification data identifying a first web page navigated to by a user;
determining a first multi-party communication session associated with the first web page based at least in part on the page identification data and attribute data describing one or more communication attributes;
adding the user to the first multi-party communication session associated with the first web page;
determining that the user exits the first web page and navigates to a second web page;
responsive to the user exiting the first web page, disconnecting the user from the first communication session associated with the first web page;
responsive to the user navigating to the second web page, determining a second multi-party communication session associated with the second web page based at least in part on the attribute data and page identification data identifying the second web page; and
adding the user to the second multi-party communication session associated with the second web page.

3. The method of claim 2, wherein determining the first multi-party communication session comprises:
transforming the page identification data identifying the first web page to a session identifier that identifies the first multi-party communication session associated with the first web page; and
identifying the first multi-party communication session using the session identifier.

4. The method of claim 2, wherein determining the first multi-party communication session comprises:
transforming the page identification data identifying the first web page to one or more session identifiers associated with the first web page;
identifying one or more multi-party communication sessions associated with the first web page using the one or more session identifiers; and
selecting the first multi-party communication session from the one or more multi-party communication sessions based at least in part on the one or more communication attributes.

5. The method of claim 2, further comprising:
receiving configuration data from the user; and
configuring the one or more communication attributes based at least in part on the configuration data.

6. The method of claim 2, wherein the first multi-party communication session is identified by a session identifier.

7. The method of claim 6, wherein the session identifier is an identifier identifying an address associated with the first web page.

8. The method of claim 6, wherein the session identifier is a transformation of an address associated with the first web page.

9. The method of claim 2, wherein the one or more communication attributes are associated with one of a location, an interest, a relationship in a social graph and demographic information.

10. The method of claim 2, further comprising:
receiving a signal indicating that the user exits navigating the first web page; and
disconnecting the user from the first multi-party communication session associated with the first web page responsive to receiving the signal.

11. The method of claim 2, further comprising communicating users who visit the first web page in the first multi-party communication session associated with the first web page.

12. A system comprising:
a processor; a memory;
a communication module for receiving page identification data identifying a first web page navigated to by a user; and
a session module communicatively coupled to the communication module, the session module for determining a first multi-party communication session associated with the first web page based at least in part on the page identification data and attribute data describing one or more communication attributes, adding the user to the first multi-party communication session associated with the first web page, determining that the user exits the first web page and navigates to a second web page, responsive to the user exiting the first web page, disconnecting the user from the first communication session associated with the first web page, responsive to the user navigating to the second web page, determining a second multi-party communication session associated with the second web page based at least in part on the attribute data and page identification data identifying the second web page, and adding the user to the second multi-party communication session associated with the second web page.

13. The system of claim 12, wherein the session module is configured to:
transform the page identification data identifying the first web page to a session identifier that identifies the first multi-party communication session associated with the first web page; and identify the first multi-party communication session using the session identifier.

14. The system of claim 12, wherein the session module is configured to:
- transform the page identification data identifying the first web page to one or more session identifiers associated with the first web page;
- identify one or more multi-party communication sessions associated with the first web page using the one or more session identifiers; and
- select the first multi-party communication session from the one or more multi-party communication sessions based at least in part on the one or more communication attributes.

15. The system of claim 12, wherein the communication module is configured to receive configuration data from the user and further comprising a configuration module for configuring the one or more communication attributes based at least in part on the configuration data.

16. The system of claim 12, wherein the first multi-party communication session is identified by a session identifier.

17. The system of claim 16, wherein the session identifier is an identifier identifying an address associated with the first web page.

18. The system of claim 16, wherein the session identifier is a transformation of an address associated with the first web page.

19. The system of claim 12, wherein the one or more communication attributes are associated with one of a location, an interest, a relationship in a social graph and demographic information.

20. The system of claim 12, wherein the communication module is configured to receive a signal indicating that the user exits navigating the first web page, and the session module is configured to disconnect the user from the first multi-party communication session associated with the first web page responsive to receiving the signal.

* * * * *